(12) United States Patent
Zheng et al.

(10) Patent No.: US 8,902,429 B1
(45) Date of Patent: Dec. 2, 2014

(54) FOCUSING DETECTOR OF AN INTERFEROMETRY SYSTEM

(71) Applicant: KLA-Tencor Corporation, Milpitas, CA (US)

(72) Inventors: Jie-Fei Zheng, Fremont, CA (US); Steve Cui, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 184 days.

(21) Appl. No.: 13/705,873

(22) Filed: Dec. 5, 2012

(51) Int. Cl.
  *G01B 9/02* (2006.01)
(52) U.S. Cl.
  CPC .................................. *G01B 9/02035* (2013.01)
  USPC ....................................................... 356/450
(58) Field of Classification Search
  CPC .............. G01B 9/02; G01J 11/00; G01J 9/02; G01J 9/0246; G01N 21/45
  USPC .......................................................... 356/450
  See application file for complete search history.

(56) References Cited

U.S. PATENT DOCUMENTS 7,342,664 B1 * 3/2008 Radziszewski ............... 356/455
2003/0118245 A1 * 6/2003 Yaroslavsky et al. ......... 382/255

* cited by examiner

*Primary Examiner* — Tarifur Chowdhury
*Assistant Examiner* — Md Rahman
(74) *Attorney, Agent, or Firm* — Suiter Swantz pc llo

(57) ABSTRACT

The disclosure is directed to focusing one or more detectors of an interferometry system. An initial focus position may be determined by focusing a detector on an edge of a sample by comparing image contrast of intensity frames collected by the detector. Data associated with an inner edge of a ring formed by the image of the sample reflected on a reference flat may be collected from one or more positions near the initial focus position. The detector can be focused to a selected position by comparing edge data collected at the various detector positions near the initial focus position.

25 Claims, 3 Drawing Sheets

FOCUSING DETECTOR OF AN INTERFEROMETRY SYSTEM

TECHNICAL FIELD

The present disclosure generally relates to the field of interferometry systems and more particularly to focusing one or more detectors of an interferometry system.

BACKGROUND

Interferometry is a useful technique for measuring one or more spatial characteristics of a sample, such as a semiconductor wafer or any other semiconductor or non-semiconductor substrate. Semiconductor wafers are continually being fabricated with tighter specifications. Interferometry systems must, therefore, perform at higher levels of accuracy and precision to meet the needs imposed by modern semiconductor technologies.

One or more detectors of an interferometry system must be focused correctly prior to making measurements in order to achieve matching among different systems. A detector may be adjusted to a focus position by manually focusing on a sharp edge of an artifact disposed proximate to a test surface of a sample. However, the foregoing method does not provide adequate focus for some applications and requires specially designed samples, such as specially patterned wafers, which are often expensive.

SUMMARY

In one aspect, the present disclosure is directed to an interferometry system with one or more channels including detectors focused according to an algorithm performed by a computing system. The interferometry system may include at least two reference flats configured to receive a sample in a cavity formed by a first reference flat and a second reference flat. At least one illumination source may be configured to illuminate at least one surface of the sample and at least one surface of the at least two reference flats. At least one detector may be configured to receive one or more interferograms produced by illumination reflected from at least one of: the at least one surface of the sample and the at least one surface of the at least two reference flats. The computing system may be configured to: determine an initial focus position of the at least one detector utilizing a first set of interferograms; collect data associated with an inner edge of a ring of the cavity utilizing one or more additional sets of interferograms received by the at least one detector at additional positions near the initial focus position; and determine a selected focus position of the at least one detector utilizing the collected data.

In another aspect, the present disclosure is directed to a method of focusing at least one detector of an interferometry system. The method may include the steps of: receiving a sample in a cavity formed by a first reference flat and a second reference flat of the interferometry system; illuminating at least one surface of the sample and at least one surface of the first and second reference flats; receiving a first set of interferograms utilizing at least one detector, the interferograms resulting from illumination reflected from at least one of: the at least one surface of the sample and the at least one surface of the first and second reference flats; determining an initial focus position of the at least one detector utilizing the first set of interferograms; collecting data associated with an inner edge of an image of the cavity utilizing one or more additional sets of interferograms received by the at least one detector at one or more additional positions near the initial focus position; and determining a selected focus position of the at least one detector utilizing the collected data.

In yet another aspect, the present disclosure is directed to a method of focusing at least one detector of an interferometry system. The method may include the steps of: receiving a sample in a cavity formed by a first reference flat and a second reference flat of an interferometry system; illuminating at least one surface of the sample and at least one surface of the first and second reference flats; receiving a first set of interferograms utilizing at least one detector, the interferograms resulting from illumination reflected from at least one of: the at least one surface of the sample and the at least one surface of the first and second reference flats; determining an initial focus position of the at least one detector by comparing image contrast of two or more intensity frames associated with the first set of interferograms; receiving one or more additional sets of interferograms utilizing the at least one detector disposed at one or more additional positions near the initial focus position; acquiring data points associated with an inner edge of a ring of the cavity utilizing one or more additional sets of intensity frames associated with the one or more additional sets of interferograms; determining diameter values of the inner edge of the ring of the cavity measured at the one or more additional positions of the detector utilizing the data points; and determining a selected focus position of the at least one detector by comparing diameter values of the inner edge of the ring of the cavity measured at the one or more additional positions of the detector.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
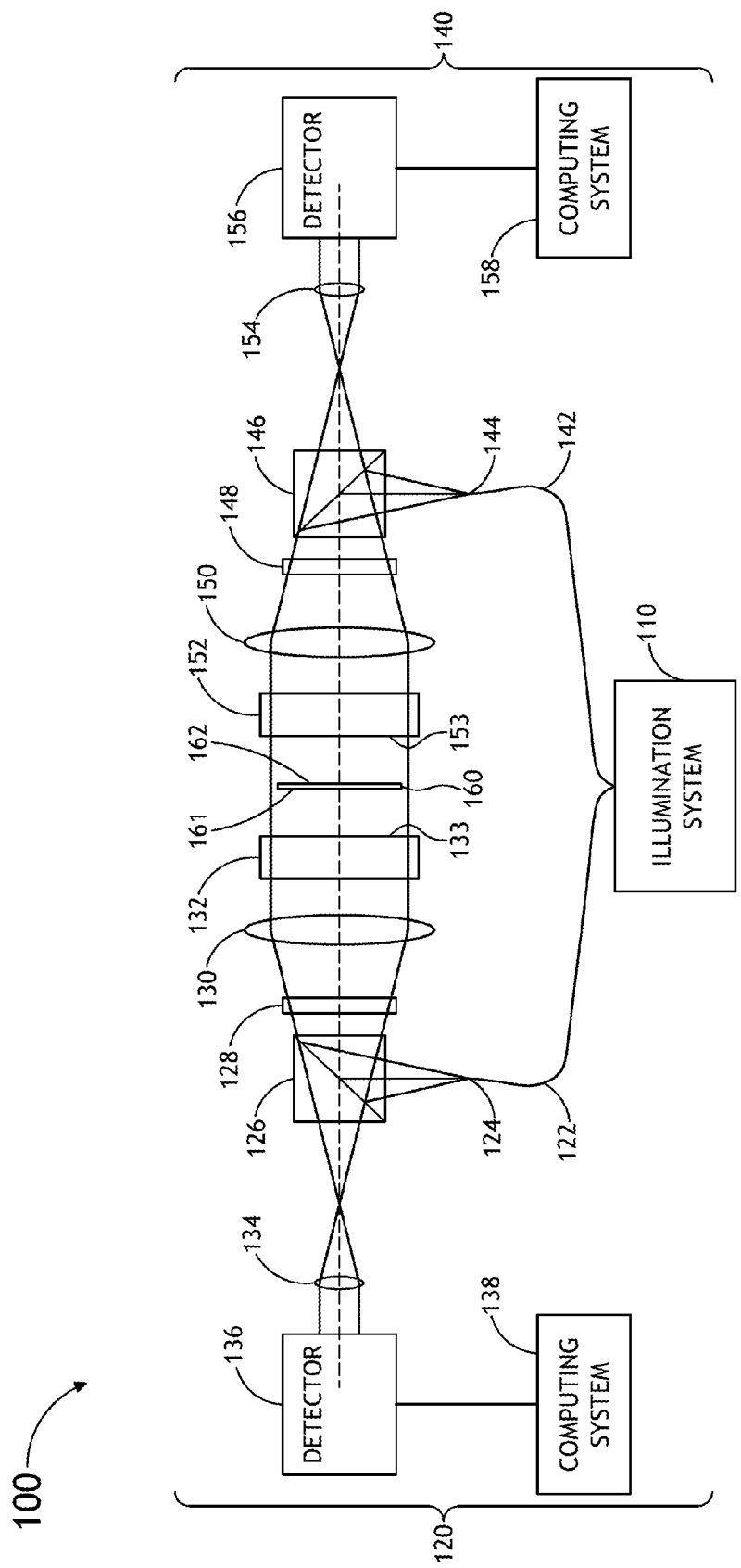
FIG. 1 is a block diagram illustrating an interferometry system, in accordance with an embodiment of this disclosure.
Figure 2:
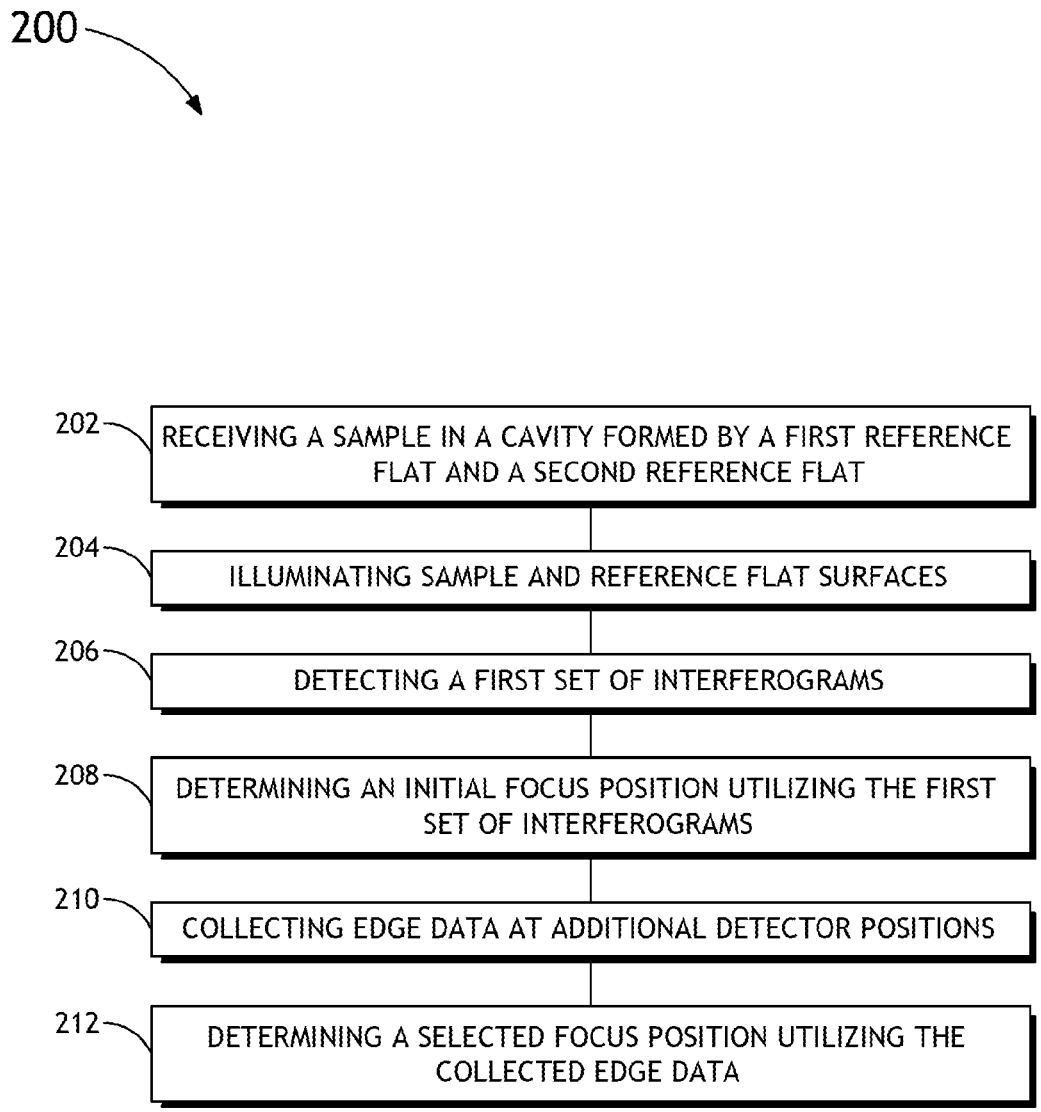
FIG. 2 is a flow diagram illustrating a method of focusing at least one detector of an interferometry system, in accordance with an embodiment of this disclosure.
Figure 3:
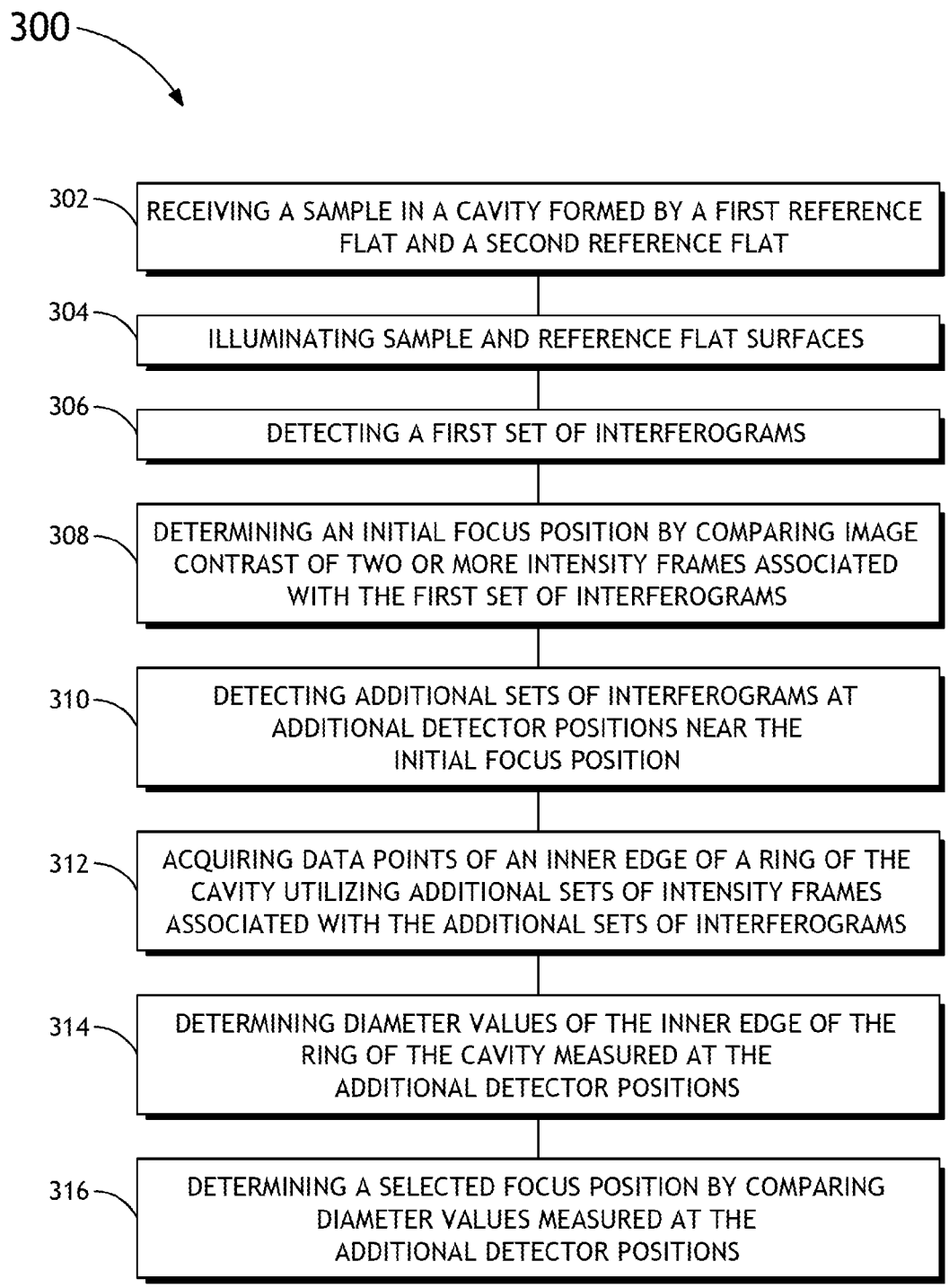
FIG. 3 is a flow diagram illustrating a method of focusing at least one detectors of an interferometry system, in accordance with an embodiment of this disclosure.

FIGS. 1 through 3 generally illustrate a method of focusing one or more detectors of an interferometry system, in accordance with the present disclosure. In some embodiments, the interferometry system may include, but is not limited to, a single-channel or dual-channel Fizeau interferometer. The method relies on edge data within depth of focus and beyond depth of focus to select a detector position, thereby allowing for improved accuracy and/or precision.

As used throughout the present disclosure, the terms "sample" or "wafer" generally refer to any substrate formed of a semiconductor or non-semiconductor material. For example, semiconductor or non-semiconductor materials include, but are not limited to, monocrystalline silicon, gallium arsenide, and indium phosphide. A wafer may include one or more layers. For example, such layers may include, but are not limited to, a resist, a dielectric material, a conductive material, and a semiconductive material. Many different types of such layers are known in the art, and the term wafer as used herein is intended to encompass a wafer on which all types of such layers may be formed. Furthermore, the term "sample" may refer to any artifact having a sufficiently defined edge for implementing any of the following system(s) and/or method(s), regardless of shape (e.g. circular, elliptical, square, triangular, and the like).

FIG. 1 illustrates an embodiment of an interferometry system 100. At least a portion of the interferometry system 100 may be further described in U.S. Pat. No. 6,847,458 and/or U.S. Publication No. 2010/0208272 A1, both incorporated herein by reference. It is further noted that several interferometry systems are known to the art, and embodiments of system 100 described herein are included by way of example only. Various parameters may be altered without departing from the essence of the disclosure. For example, the system 100 may be implemented with any number and/or type of detectors, illumination sources, and optical elements having a variety of arrangements which may differ from the embodiments described herein. Accordingly, the following description of system 100 is not intended to limit the present disclosure in any way.

The system 100 may be configured to measure one or more spatial characteristics of a sample 160 such as, but not limited to, shape or thickness. The system 100 may include one or more interferometry channels 120, 140. For example, embodiments of system 100 may include a single-channel Fizeau interferometer or dual-channel Fizeau interferometer (e.g. WAFERSIGHT by KLA-Tencor Corporation). The system 100 may further include an illumination system 110 including at least one illumination source configured to provide illumination along one or more illumination paths to each of the interferometry channels 120, 140. In an embodiment, each illumination path may include one or more optical fibers 122, 142 configured to transmit at least a portion of illumination from the illumination system 110 to a respective illumination output 124, 144 of each channel 120, 140. Each illumination output 124, 144 may be further configured to direct at least a portion of illumination to the respective interferometry channel 120, 140.

In an embodiment, each interferometry channel 120, 140 may include a polarizing beam splitter 126, 146 configured to receive illumination from a respective illumination output 124, 144. The polarizing beam splitter 126, 146 may be further configured to direct a portion of illumination to a quarter-wave plate 128, 148 aligned 45 degrees to the polarization direction of illumination reflected from the polarizing beam splitter 126, 146. The portion of illumination may then propagate to a lens 130, 150 configured to collimate illumination into a beam having a diameter greater than a diameter of a sample 160. The lens 130, 150 may be further configured to direct the collimated beam through a reference flat 132, 152. In an embodiment, at least two reference flats 132 and 152 may be located parallel to one another. The sample 160 may be disposed in the center of a cavity defined by a first reference flat 132 and a second reference flat 152.

At least a portion of the collimated beam may be transmitted through the first reference flat 132, 152. A first portion (e.g. central portion) of the transmitted beam may be reflected at a test surface 161, 162 of the sample 160. A second portion (e.g. outer portion) of the transmitted beam may be directed to a surface 153, 133 of the second reference flat 152, 132 disposed opposite the first reference flat 132, 152. By way of further example, the first portion of a transmitted beam from reference flat 132 may be directed to test surface 161 of the sample 160; meanwhile, the second portion of the transmitted beam from reference flat 132 may be directed to reference surface 153 of reference flat 152. Furthermore, in a dual-channel embodiment (as illustrated in FIG. 1), the first portion of a transmitted beam from reference flat 152 may be directed to test surface 162 of the sample 160; meanwhile, the second portion of the transmitted beam from reference flat 152 may be directed to reference surface 133 of reference flat 132.

Each interferometry channel 120, 140 of the system 100 may further include one or more detectors 136, 156 such as, but are not limited to, cameras (e.g. CCD, CMOS, etc.) or photodiodes. Each detector 136, 156 may be configured to receive portions of illumination reflected from at least one test surface 161, 162 of the sample 160 and/or at least one surface 133, 153 of the first and second reference flats 132, 152. In one embodiment, the first portion of the transmitted beam reflected at the test surface 161, 162 forms an interferogram with a portion of the illumination beam reflected from the first reference surface 133, 153. In addition, the second portion of the transmitted beam reflected at the second reference surface 153, 133 forms an interferogram with a portion of the illumination beam reflected from the first reference surface 133, 153. The one or more detectors 136, 156 of each channel 120, 140 may be configured to record interferograms in at least one set of intensity frames for each received set of one or more interferograms.

The system 100 may further include one or more computing systems 138, 158 communicatively coupled to the one or more detectors 136, 156. The communicative coupling may include, but is not limited to, a direct link, ad-hoc networking, wired or wireless local area networking (LAN), Bluetooth, infrared, RF, or any other communication protocol or combination of communication protocols known in the art. In some embodiments, a single computing system 138 or 158 may be communicatively coupled to the one or more detectors 136, 156 of each channel 120, 140. In other embodiments, each of a plurality of computing systems 138 and 158 may be communicatively coupled to the one or more detectors 136 and 156 of a respective channel 120 and 140.

The one or more computing systems 138, 158 may be configured to acquire information associated with detected illumination from the one or more detectors 136, 156 of each channel 120, 140. In some embodiments, the one or more computing systems 138, 158 may be configured to receive information (e.g. electrical signals, data frames, image frames, etc.) associated with detected interferograms from the one or more detectors 136, 156 via the communicative coupling. In other embodiments, the one or more computing systems 138, 158 are not coupled to the one or more detectors 136, 156, and information may be delivered to the one or more uncoupled computing systems 138, 158 via transportable carrier media, such as a flash drive, memory card, optical disk, solid state disk (SSD), hard disk drive (HDD), and the like.

The one or more computing systems 138, 158 may include one or more processors (e.g. single-core or multiple-core CPU) configured to execute program instructions from carrier media to determine a selected focus position for at least one detector 136. The program instructions may direct a computing system 138, 158 to complete one or more steps of method 200 and/or method 300, illustrated in FIGS. 2 and 3 and further described herein. System 100 is a manifestation of methods 200 and 300; accordingly, all steps or features described with regard to system 100, method 200, or method 300 are applicable any of system 100, method 200, and method 300 unless otherwise noted. However, it is contemplated that one or more steps of method 200 and/or method 300 may be executed via various means known to the art including, but not limited to, interferometry systems having alternative arrangements, number of channels, and/or other parameters differing from embodiments of system 100 described herein. Therefore, embodiments of system 100 described herein should not be interpreted to limit method 200 or method 300 in any way.

FIG. 2 illustrates a method 200 of focusing at least one detector 136, 156 of an interferometry system 100, in accordance with an embodiment of the present disclosure. At step 202, a sample 160 may be disposed in a cavity formed by a first reference flat 132 and a second reference flat 152. At step 204, the sample 160 and reference flats 132, 152 may be illuminated so that interferograms result from illumination reflected from at least one sample surface 161, 162 and/or at least one reference surface 133, 153.

At step 206, the detector 136, 156 being focused may receive a first set of one or more interferograms. At step 208, the first set of interferograms may be compared against one another to determine an initial focus position. In some embodiments, the initial focus position may be ascertained by focusing the detector 136, 156 on a defined (e.g. sharp) edge of the sample 160, wherein the detector is focused on the sample edge by comparing image contrast of intensity frames associated with the first set of interferograms.

At step 210, the detector 136, 156 may be actuated to a plurality of additional positions near the initial focus position while additional sets of interferograms are detected at each of the additional positions. The additional interferogram sets may be utilized to determine or collect spatial data (e.g. diameter) of an inner edge of a ring or alternatively shaped image formed in the cavity by reflection of the sample 160 on the first or second reference surfaces 133, 153. At step 212, the spatial data collected for the inner edge at the plurality of additional positions may be compared to determine a selected focus position of the detector 136, 156.

FIG. 3 illustrates a method 300 of focusing at least one detector 136, 156 of an interferometry system 100, in accordance with another embodiment of the present disclosure. Method 300 may include some or all steps of method 200. For example, steps 302, 304, and 306 include some or all of steps 202, 204, and 206, respectively. At step 308, the detector 136, 156 may be further configured to record the first set of interferograms in a first set of intensity frames (e.g. data and/or image frames) which are transmitted via communicative coupling or transferred via transportable carrier media to a computing system 138, 158. The initial focus position may be determined by comparing image contrast of the intensity frames. In some embodiments, the initial focus position may be associated with a selected contrast level corresponding to focus of the detector 136, 156 on a defined (e.g. sharp) edge of the sample 160. For example, the initial focus position may correspond to a highest image contrast (i.e. best focus) ascertained from the first set of intensity frames.

At step 310, the detector 136, 156 may be actuated to a plurality of additional positions near the initial focus position while additional sets of interferograms are detected at each of the additional positions. At step 312, the additional interferogram sets may be recorded in additional intensity frame sets and transmitted or transported to the computing system 138, 158. The computing system 138, 158 may be configured to extract spatial data points representing the inner edge of the ring or alternatively shaped image formed in the cavity from the additional sets of intensity frames.

At step 314, the spatial data points measured at each of the additional locations may be compared to determine the selected focus position of the detector 136, 156. For example, spatial data, such as diameter, of the inner edge of the ring may be analyzed as a function of detector position utilizing the collected data points. In some embodiments, the data points may be conditioned utilizing an appropriate data fitting procedure, such as a parabolic fitting, and plotted as a function of detector position. The spatial data collected at each of the additional locations may be compared to determine the selected focus position of the detector 136, 156. In some embodiments, the selected focus position is a position from the analyzed detector positions. In some embodiments, the selected focus position is the detector position associated with a smallest or largest spatial data measurement (i.e. sharpest focus). For example, a diameter value of the inner edge of the ring measured at the selected focus position may be greater than or equal to any of the diameter values of the inner edge of the ring measured at the additional detector positions.

In some embodiments of system 100, method 200, and/or method 300, phase shifting speed of the interferometry system 100 is calibrated by at least one polished opaque plate in the cavity formed by the first and second reference flats 132 and 152. The polished opaque plate may be included in at least a portion of the reference flats 132 and 152.

In some embodiments, cavity characteristics of the reference flats 132, 152 may be calibrated prior to making any measurements (i.e. collecting interferograms associated with the sample 160). In some embodiments, the cavity characteristics may be calibrated prior to each sample measurement.

In some embodiments, the sample 160 may be disposed between two interferometry channels 120 and 140 (e.g. a first and a second Fizeau interferometer). In some embodiments, the reference flats 132 and 152 extend beyond a diameter of the sample 160. Accordingly a ring may result in the cavity around the sample 160 with fringes of the ring being formed by the reference flats 132 and 152.

In some embodiments, wavelength of illumination provided by the illumination system 110 may be varied to acquire at least one set of intensity frames that record interferograms with different phase shifts. The computing system 138, 158 may be configured to exact phases and phase shifts of the interferograms from the intensity frames.

In some embodiments, the inner edge of the ring of the cavity may be detected utilizing annular cavity ring fringe modulation information. The fringes of the ring may be formed by the first and second reference surfaces 133 and 153. The inner diameter of the ring may be determined utilizing edge point data.

In some embodiments, a non-circular sample may be utilized to focus the one or more detectors 136, 156 of the interferometry system. Accordingly, the edge data may correspond to alternative shapes including, but not limited to, a rectangle, oval, semi-circle, triangle, and the like. A spatial parameter of any alternative shape may be utilized with an appropriate edge detection algorithm to focus a detector 136, 156 to a selected position, such as an optimal focus position or one having at least a selected level of accuracy.

It is contemplated that each of the embodiments of the method described above may include any other step(s) of any other method(s) described herein. In addition, each of the embodiments of the method described above may be performed by any of the systems described herein.

It should be recognized that the various steps described throughout the present disclosure may be carried out by a single computing system or by multiple computing systems. Moreover, different subsystems of the system may include a computing system suitable for carrying out at least a portion of the steps described above. Therefore, the above description should not be interpreted as a limitation on the present invention but merely an illustration. Further, the one or more computing systems may be configured to perform any other step(s) of any of the method embodiments described herein.

The computing system may include, but is not limited to, a personal computing system, mainframe computing system, workstation, image computer, parallel processor, or any other device known in the art. In general, the term "computing system" may be broadly defined to encompass any device having one or more processors, which execute instructions from a memory medium.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. Program instructions implementing methods such as those described herein may be transmitted over or stored on carrier medium. The carrier medium may be a transmission medium such as a wire, cable, or wireless transmission link. The carrier medium may also include a storage medium such as a read-only memory, a random access memory, a magnetic or optical disk, or a magnetic tape.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. An interferometry system, comprising:
    at least two reference flats configured to receive a sample in a cavity formed by a first reference flat and a second reference flat of the at least two reference flats;
    at least one illumination source configured to illuminate at least one surface of the sample and at least one surface of the at least two reference flats;
    at least one detector configured to receive one or more interferograms produced by illumination reflected from at least one of: the at least one surface of the sample and the at least one surface of the at least two reference flats; and
    at least one computing system, the at least one computing system configured to:
        determine an initial focus position of the at least one detector utilizing a first set of interferograms;
        collect data associated with an inner edge of a ring of the cavity utilizing one or more additional sets of interferograms received by the at least one detector at one or more additional positions near the initial focus position; and
        determine a selected focus position of the at least one detector utilizing the collected data.

2. The system of claim 1, wherein the computing system is further configured to:
    calibrate phase shift of at least one channel of the interferometry system prior to a sample measurement.

3. The system of claim 1, wherein the computing system is further configured to:
    calibrate cavity characteristics of the at least two reference flats prior to a sample measurement.

4. The system of claim 1, wherein determining the initial focus position of the at least one detector utilizing the first set of interferograms, includes:
    receiving at least one set of intensity frames associated with the first set of interferograms; and
    comparing image contrast of two or more intensity frames of the at least one set of intensity frames.

5. The system of claim 1, wherein collecting data associated with the inner edge of the ring of the cavity utilizing the one or more additional sets of interferograms received by the at least one detector at the one or more additional positions near the initial focus position, includes:
    receiving one or more additional sets of intensity frames associated with the one or more additional sets of interferograms;
    acquiring data points associated with the inner edge of the ring of the cavity utilizing the one or more additional sets of intensity frames; and
    determining diameter values of the inner edge of the ring of the cavity measured at the one or more additional positions of the detector utilizing the data points.

6. The system of claim 1, wherein determining the selected focus position of the at least one detector utilizing the collected data, includes:
    comparing diameter values of the inner edge of the ring of the cavity measured at the one or more additional positions of the detector.

7. The system of claim 6, wherein determining the selected focus position of the at least one detector utilizing the collected data, further includes:
    fitting the diameter values as a function of the one or more additional positions of the detector utilizing a parabolic fitting.

8. The system of claim 6, wherein the selected focus position of the at least one detector is selected from the one or more additional positions of the detector.

9. The system of claim 8, wherein a diameter value of the inner edge of the ring of the cavity measured at the selected focus position is not less than any of the diameter values measured at the one or more additional positions of the detector.

10. The system of claim 1, wherein the interferometry system includes at least one of: a single-channel interferometer or a dual-channel interferometer.

11. The system of claim 1, wherein the interferometry system includes a Fizeau interferometer.

12. The system of claim 1, wherein the at least one detector includes a camera.

13. A method of focusing at least one detector of an interferometry system, comprising:

receiving a sample in a cavity formed by a first reference flat and a second reference flat of an interferometry system;

illuminating at least one surface of the sample and at least one surface of the first and second reference flats;

receiving a first set of interferograms utilizing at least one detector, the interferograms resulting from illumination reflected from at least one of: the at least one surface of the sample and the at least one surface of the first and second reference flats;

determining an initial focus position of the at least one detector utilizing the first set of interferograms;

collecting data associated with an inner edge of an image of the cavity utilizing one or more additional sets of interferograms received by the at least one detector at one or more additional positions near the initial focus position; and determining a selected focus position of the at least one detector utilizing the collected data.

14. The method of claim 13, wherein the method further includes:

calibrating phase shift of at least one channel of the interferometry system.

15. The method of claim 13, wherein the method further includes:

calibrating cavity characteristics of the first and second reference flats.

16. The method of claim 13, wherein determining the initial focus position of the at least one detector utilizing the first set of interferograms, includes:

receiving at least one set of intensity frames associated with the first set of interferograms; and comparing image contrast of two or more intensity frames of the at least one set of intensity frames.

17. The method of claim 13, wherein collecting data associated with the inner edge of the image of the cavity utilizing the one or more additional sets of interferograms received by the at least one detector at the one or more additional positions near the initial focus position, includes:

receiving one or more additional sets of intensity frames associated with the one or more additional sets of interferograms;

acquiring data points associated with the inner edge of the image of the cavity utilizing the one or more additional sets of intensity frames; and determining spatial data values of the inner edge of the image of the cavity measured at the one or more additional positions of the detector utilizing the data points.

18. The method of claim 17, wherein determining the selected focus position of the at least one detector utilizing the collected data, includes:

comparing spatial data values of the inner edge of the image of the cavity measured at the one or more additional positions of the detector.

19. The method of claim 18, wherein determining the selected focus position of the at least one detector utilizing the collected data, further includes:

fitting the spatial data values as a function of the one or more additional positions.

20. The method of claim 18, wherein the selected focus position of the at least one detector is selected from the one or more additional positions of the detector.

21. The method of claim 20, wherein the inner edge of the image of the cavity comprises a ring, wherein the spatial data values include diameter values of the ring, wherein a diameter value of the ring of the cavity measured at the selected focus position is not less than any of the diameter values measured at the one or more additional positions of the detector.

22. A method of focusing at least one detector of an interferometry system, comprising:

receiving a sample in a cavity formed by a first reference flat and a second reference flat of an interferometry system;

illuminating at least one surface of the sample and at least one surface of the first and second reference flats;

receiving a first set of interferograms utilizing at least one detector, the interferograms resulting from illumination reflected from at least one of: the at least one surface of the sample and the at least one surface of the first and second reference flats;

determining an initial focus position of the at least one detector by comparing image contrast of two or more intensity frames associated with the first set of interferograms;

receiving one or more additional sets of interferograms utilizing the at least one detector disposed at one or more additional positions near the initial focus position;

acquiring data points associated with an inner edge of a ring of the cavity utilizing one or more additional sets of intensity frames associated with the one or more additional sets of interferograms;

determining diameter values of the inner edge of the ring of the cavity measured at the one or more additional positions of the detector utilizing the data points; and determining a selected focus position of the at least one detector by comparing diameter values of the inner edge of the ring of the cavity measured at the one or more additional positions of the detector.

23. The method of claim 22, wherein the method further includes:

fitting the diameter values as a function of the one or more additional positions of the detector utilizing a parabolic fitting.

24. The method of claim 22, wherein the selected focus position of the at least one detector is selected from the one or more additional positions of the detector.

25. The method of claim 24, wherein a diameter value of the inner edge of the ring of the cavity measured at the selected focus position is not less than any of the diameter values measured at the one or more additional positions of the detector.

* * * * *